United States Patent [19]

Morita

[11] Patent Number: 5,355,767
[45] Date of Patent: Oct. 18, 1994

[54] RADIO EMISSION LOCATOR EMPLOYING CANNON LAUNCHED TRANSCEIVER

[75] Inventor: Yuji Morita, Ann Arbor, Mich.

[73] Assignee: Environmental Research Institute of Michigan, Ann Arbor, Mich.

[21] Appl. No.: 241,156

[22] Filed: Mar. 6, 1981

[51] Int. Cl.$^5$ .............................................. F41G 3/14
[52] U.S. Cl. .................................... 89/41.07; 342/419
[58] Field of Search ........................ 89/41 SW, 41.07; 244/3.11, 3.14, 3.19; 343/113 R, 113 PT, 417, 419; 342/417, 419, 424

[56] References Cited

U.S. PATENT DOCUMENTS

| | | | |
|---|---|---|---|
| 2,996,711 | 8/1961 | Heiser | 343/113 R |
| 3,721,410 | 3/1973 | Anspacher | 244/3.14 |
| 3,962,537 | 6/1976 | Kearns et al. | 244/3.14 |
| 3,984,068 | 10/1976 | McPhee | 244/3.19 |
| 4,004,487 | 1/1977 | Kichweber | 89/41 L |
| 4,134,681 | 1/1979 | Elmer | 356/152 |
| 4,267,562 | 5/1981 | Raimondi | 89/41 TV |
| 4,315,609 | 2/1982 | McLean et al. | 244/3.14 |
| 4,320,400 | 3/1982 | Chasek | 343/113 R |

OTHER PUBLICATIONS

Lt. Col. Paul W. Post, "Tactical Electronic Reconnaissance Sensor", Proceedings of the IEEE 1979 National Aerospace and Electronics Conference.

*Primary Examiner*—Stephen C. Bentley
*Attorney, Agent, or Firm*—Krass & Young

[57] ABSTRACT

A system for locating microwave radiation sources such as radar, jamming equipment and the like, employs a cannon launched shell including a frequency scanning receiver for the microwave emissions. Received information is processed on the shell and can derive signals that are used to modulate a telemetry transmitter. A ground base telemetry receiver associated with the launching cannon, includes means for processing the signals to derive the location of the microwave sources relative to the shell, and for processing information relating to the shell launch to determine its instantaneous position and attitude. The location of the sources relative to the launch site is then calculated and is used to aim the cannon and destroy the emission site.

16 Claims, 4 Drawing Sheets

RADIO EMISSION LOCATOR EMPLOYING CANNON LAUNCHED TRANSCEIVER

DESCRIPTION

Technical Field

This invention relates to a system for detecting microwave emission sources such as radar and the like through the use of a receiver disposed in a predetermined trajectory missile such as an artillery shell. The shell-borne equipment includes a telemetry transmitter for relaying emission source locating information derived from the received signals to a ground based receiver which calculates the positions of the sources based on the calculated position of the shell and the received information.

Background Art

In modern warfare extensive use is made of radio systems, particularly in the microwave range. Radar is used for surveillance and target acquisition purposes, various forms of radio communication coordinate the efforts of rapidly moving units, and jammers and decoys are extensively employed to impair the effectiveness of enemy radar and communication systems. Knowledge of the location of both enemy and friendly radio emission sources is accordingly important to the attainment of both offensive and defensive objectives. Relatively low frequency electro-magnetic sources can be located at substantial distances using well-established direction finding techniques, but the location of higher frequency sources, in the microwave range in particular, poses a more difficult problem because of the shorter range of these transmissions, usually limited to line-of-sight.

Manned aircraft equipped with microwave emission source location receivers have been used in the past to detect and locate radars, jamming equipment and the like, but these expensive planes are relatively easy for enemy forces to locate and destroy. Moreover, complex and expensive equipment is required to determine the location of the emission sources relative to the plane and also to determine the instantaneous location, attitude and velocity of the plane, so that the sources may be located relative to a reference ground position.

SUMMARY OF THE INVENTION

The present invention provides a relatively low cost system for detecting the locations of radio emission sources in a battlefield environment that provides multiple advantages in terms of simplicity, speed and invulnerability to enemy detection and interruption.

Broadly, the present invention provides a missile, preferably a ballistics shell, having a known trajectory or flight path upon launching, equipped with a receiver for the electro-magnetic radiation it is desired to detect, a processor for deriving position detecting information from the received signals, and telemetry means for relaying the detected information to a ground based computer operative to calculate the locations of the emission sources based upon the known instantaneous position and attitude of the missile and the instantaneous detected radiation.

The invention may be applied to any projectile that has a predetermined flight pattern after launching so that its instantaneous position and course can be calculated on the ground based on the launch data and the time since launch. These projectiles include various rockets and the like, but the preferred embodiment of the invention employs a cannon launched artillery shell as the carrier. The system includes a suitable computer, preferably located adjacent the launching cannon, for calculating the instantaneous position and attitude of the shell based upon its launch information, including relevant meteorological information such as wind velocity, air density and the like.

The shell itself includes sensors to detect the electromagnetic radiation, taking the form of antennae in the preferred case of microwave emission detection. A frequency scanning receiver connected to the antennae provides its output to a processor which derives information relating to the location and nature of the emission. A telemetry transmitter in the shell bas its output signal modulated by this information. The information is relayed to a telemetry receiver associated with the ground based computer and the launch cannon. The information is then further processed to compute the location of various emission sources relative to the shell and, from the data related to the known trajectory of the shell, to compute the location of the sources relative to the cannon. This information is used to control the cannon to fire artillery rounds at the target.

This system has a number of advantages over conventional microwave emission location systems. First, it makes use of the known position and attitude of the shell without the necessity of real time measurements of the shell position and course.

The system is relatively immune to enemy counter actions. The shell's high velocity, small size and hard casing make it difficult for conventional anti-aircraft defenses to shoot down the shell. Electronic countermeasures will be difficult to apply to the data link because the ground-based receiver may be concealed and because anti-jam coding techniques can be applied to the data-link transmission.

The system may also be calibrated by comparing the calculated positions of either friendly or hostile emitters with their known positions to derive correction factors for the shell's trajectory.

The system may additionally be used to tie together batteries operating in separate coordinate systems by determining the position of a common target with each of the systems.

When the system is used to aim the cannon for firing of a destructive artillery round at the detected emission site any distorting effects that cause a variation in the detecting shell trajectory from its calculated position, such as wind shifts and the like, produce a similar distorting effect on the subsequent artillery round and are accordingly largely cancelled. The system thus attains a higher accuracy than it would in merely calculating the position of the emission source.

Any of a variety of techniques may be employed to calculate the position of the emission sources relative to the instrumented shell. These include the rate of change of angle of the target relative to the shell and the rate of change of the frequency of the detected emission at the shell, i.e., doppler change. Combinations of these effects are effectively employed in a preferred embodiment of the invention.

Trade-offs exist between the processing performed at the shell and processing performed at the ground computer. At one extreme the raw signals detected by the shell receiver could be transmitted to the ground computer. This minimizes the complexity of the detecting shell but increases the complexity of the telemetry signal and its vulnerability to jamming.

At the other extreme, the complete calculation of emission source location and type of emission could be calculated at the shell, allowing a relatively simple signal to be relayed to the ground base station.

In a preferred embodiment of the invention the scanning receiver at the shell is controlled by the detected emissions to cause the receiver to dwell on each detected signal for a controlled period of time. The shell further includes a horizon detector, preferably of the infrared sort, operative to generate information which is used to eliminate ambiguities in the detected emission source position. The receiver may further include a replaceable or reprogrammable read-only memory that stores characteristics of emission sources of interest, such as frequency, pulse duration, pulse repetition rate and the like. The received information may be correlated with the content of the read-only memory to generate signals representative of the emission type for transmission to the ground base computer.

The characteristics of a signal intercepted by the shell receiver may be used to identify a source that is tracking the shell in an effort to locate and target on the cannon site. An alarm signal generated by this detection may alert the cannon crew to the need to relocate.

DESCRIPTION OF THE DRAWINGS

Other objectives, advantages and applications of the present invention will be made apparent by the following detailed description of a preferred embodiment of the invention. The description makes reference to the accompanying drawings in which.

DETAILED DESCRIPTION OF THE INVENTION

Figure 1:
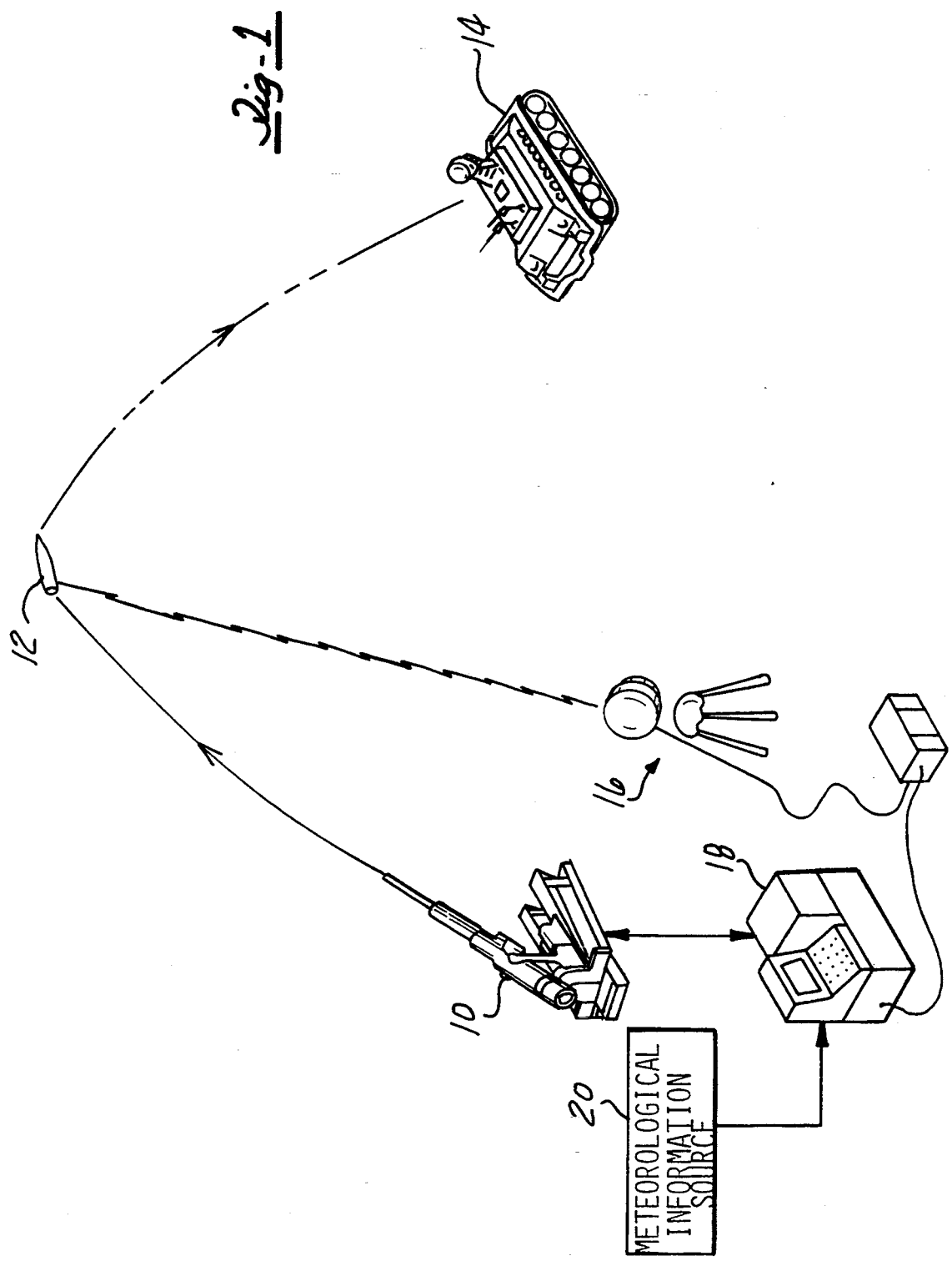
FIG. 1 is a pictorial representation of a preferred embodiment of the invention employed to detect a radar source.

FIG. 1 illustrates the manner in which the preferred embodiment of the present invention is utilized in a battlefield situation. A cannon 10, which may typically be a 155 millimeter cannon, is used to launch an instrumented shell generally indicated at 12 in the general region of enemy microwave sources such as a mobile radar 14. The shell 12 contains a receiver for the radar source and detects information relating to the location of the source, processes it, and transmits it to a ground based receiver 16, preferably associated in proximity to the cannon 10. The received telemetered information is provided to a computer 18 associated with the cannon battery. The computer also receives information relating to the condition of the cannon and meteorological information from a source 20. The meteorological information may be entered into the computer 18 manually or may be provided over suitable electronic links.

Based on the information that it receives from the cannon 10 and the meteorological source 20, the computer 18 calculates the trajectory of the shell 12 and accordingly its instantaneous position along its trajectory. Utilizing this information and the information received from the shell 12 over the telemetry link relating to the position of the emission source relative to the shell, the computer can calculate the absolute position of the emission source 14 or its position relative to the cannon 10. This information may be provided to the cannon to aim it for the firing of a subsequent destructive round directed at the emission source.

Figure 2:
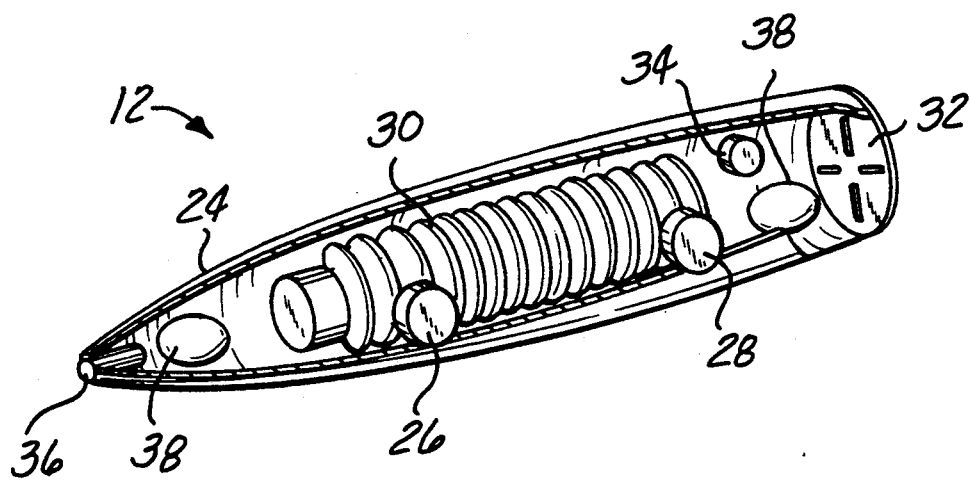
FIG. 2 is a perspective view of the instrumented cannon shell employed with the preferred embodiment of the invention, partially broken away for purposes of illustration.

The shell 12, illustrated in more detail in FIG. 2, preferably employs a casing 24 identical to the casing of a conventional artillery shell that can be fired by the cannon 10. The contents of the casing are also arranged so the shell has the same weight and center of gravity as a conventional artillery shell of the same size and accordingly will follow the same trajectory as a conventional shell when it is launched by the cannon 10.

The shell 12 preferably contains a pair of emission detecting antennae 26 and 28 spaced along the central axis of the casing 24, with each supported in a radiation transparent window formed through the material of the shell. The antennae 26 and 28 are preferably of conventional spiral configuration designed to receive microwave emission in the 2-18 Ghz band which includes all conventional radars. Most longer range radars typically operate at lower frequencies but they are not likely to be targets for artillery. In alternative embodiments of the invention emission detectors could be provided for these lower frequencies. Additionally, the concept is capable of accommodating higher frequencies, if so desired.

The antennae 26 and 28 preferably have conventional doughnut broad-band radiation patterns. The separation of the antennae 26 and 28 along the length of the shell should be as great as possible but must exceed one wavelength of the lowest frequencies to be detected. The accuracy of position detection improves as the number of wavelengths by which the antennae are separated increases.

The antennae are connected to electronic circuitry contained in disc-shaped circuit boards 30 stacked within the shell. The circuit boards include a power supply, an inter-ferometric receiver connected to the antenna, controller and processing circuitry, and a data link transmitter. The data link transmitting antenna 32 is preferably formed on the rear of the shell.

The data link antenna 32 is preferably a slotted dipole microwave antenna configured for the L band or 1 Ghz. Assuming that the shell diameter is approximately six inches, the slotted antenna may be a conventional one-half wavelength configuration.

The shell further includes an infrared sensor 34 positioned at an infrared transparent window in the shell casing. A conventional proximity fuze 36 may be formed at the nose of the shell. Explosives and ballasts 38 may be distributed within the shell to give it required weight characteristics and to cause it to explode upon impact. Such explosion is desirable for several purposes: first, to terminate the transmission of the instrumented shells so that it doesn't interfere with subsequent shells; secondly, to destroy the shell so it is not available for enemy inspection; and third, to impose destruction on the enemy.

Figure 3:
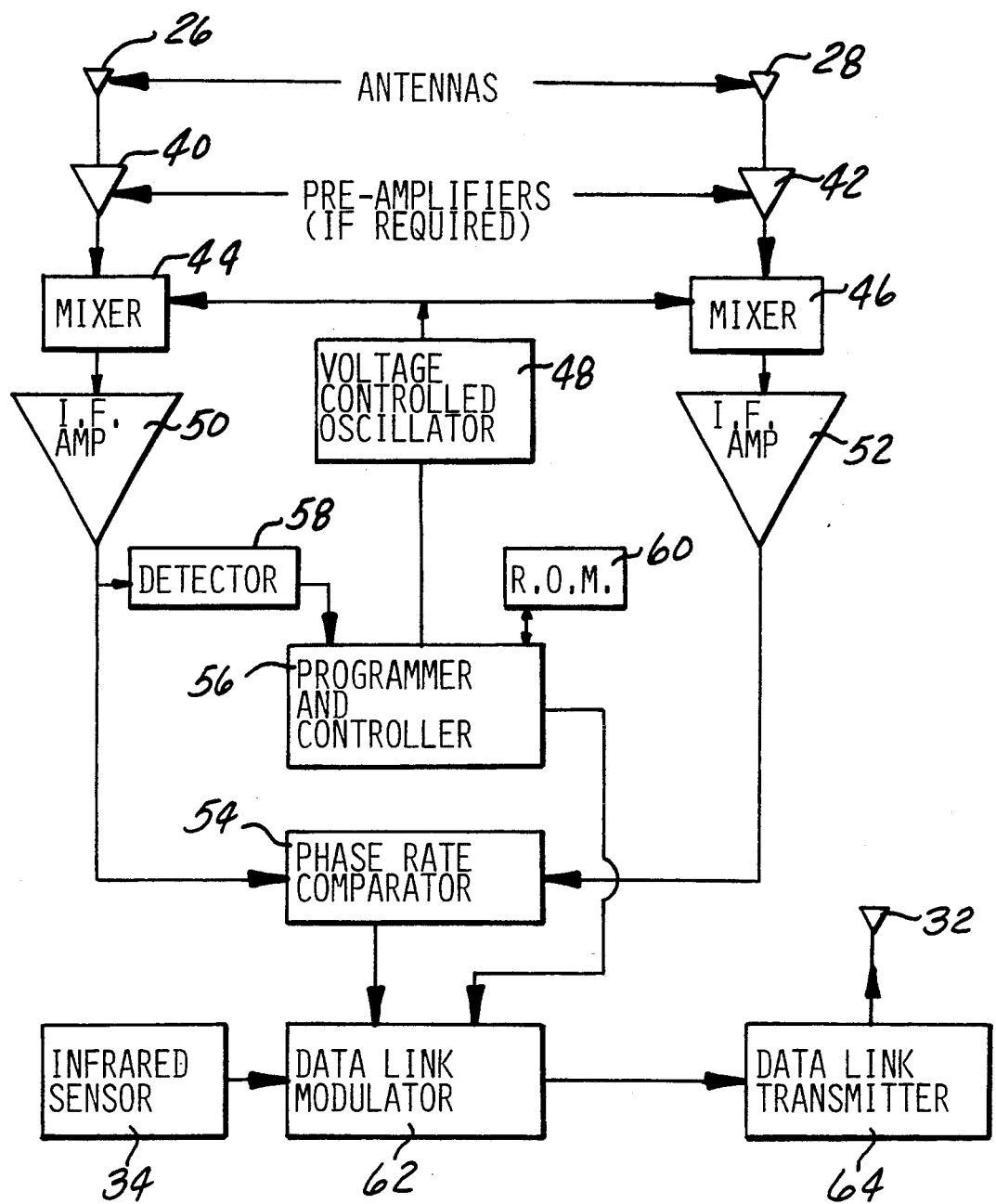
FIG. 3 is a schematic diagram of the electronic circuitry contained within the shell of FIG. 2 in the preferred embodiment of the inveniton.

The nature of the electronics contained within the shell 12 is generally indicated in FIG. 3. The system incorporates dual emission detection antennae 26 and 28 so that the phase differences between the signals received from the two antennae may be employed to calculate the rate of change of phase difference. The bearing angle and/or rate to the target may be determined from this. The rate of change of bearing between the shell and the source and thence the position of the source relative to the shell may be calculated. Signals from the infrared sensor 34 are used to eliminate ambiguities in the emission position as calculated from these signals.

The outputs of emission detection antennae 26 and 28 are each preferably provided to pre-amplifiers 40 and 42. The amplified outputs are provided to a pair of superheterodyne mixers 44 and 46 which also receive the output of a voltage controlled oscillator 48 to produce intermediate frequency signals that are amplified by i-f amplifiers 50 and 52 having narrow band-widths which act in conjunction with controlled received sensitivity to exclude extraneous signals. The amplified intermediate frequency signals are both provided to a phase rate comparator 54 to generate a signal representing the rate of change of the phase difference between the two detected signals as a function of time. As will be subsequently described, this signal is a function of the rate of change of bearing rate and may be used to calculate emission source location relative to the shell at the ground base computer 18.

The frequency to which the voltage controlled oscillator is tuned is determined by a programmer and controller 56. This circuit receives the output of a detector 58 for the out-put of the i-f amplifier 50. The detector 58 produces an amplitude signal that the unit 56 employs to control the scan of the oscillator 48. The programmer and Controller compares the nature of the detected signal, in terms of pulse type, pulse duration, pulse frequency and wavelength, with known emission source characteristics as encoded in a read-only memory 60, connected to the programmer and controller 56. The read-only memory is preferably replaceable or reprogrammable so that the latest information on emission types of interest may be plugged into the system.

Programmer and controller 56 preferably causes the voltage controlled oscillator 48 to scan the band width of interest until a signal is detected. The scan may be stopped until the characteristics of the received signal are detected. The programmer and controller provide this information on the nature of the detected emission signal to a data link modulator 62 which also receives the phase rate signal from the phase rate comparator 54 and the output of the infrared sensor 34.

The programmer and controller 56 may also analyze the amplitude of a detected signal over a period of time to detect the possibility that the shell itself is being tracked. If this condition is sensed it may send an emergency function signal over the telemetry link since it is possible that an enemy can calculate the location of the artillery from the sensed trajectory of the shell in order to fire an offensive round at the artillery.

The data link modulator 62 provides the output of the infrared sensor, the phase rate information and the emission type information from the programming controller 56 to a data transmitter 64 which feeds the data link antenna 32. This information is transmitted to the ground based data link receiver and then provided to the computer 18. The computer than calculates the location of the emission source relative to the shell.

Calculation of Emitter Location Based on Bearing Rate

Figure 4:
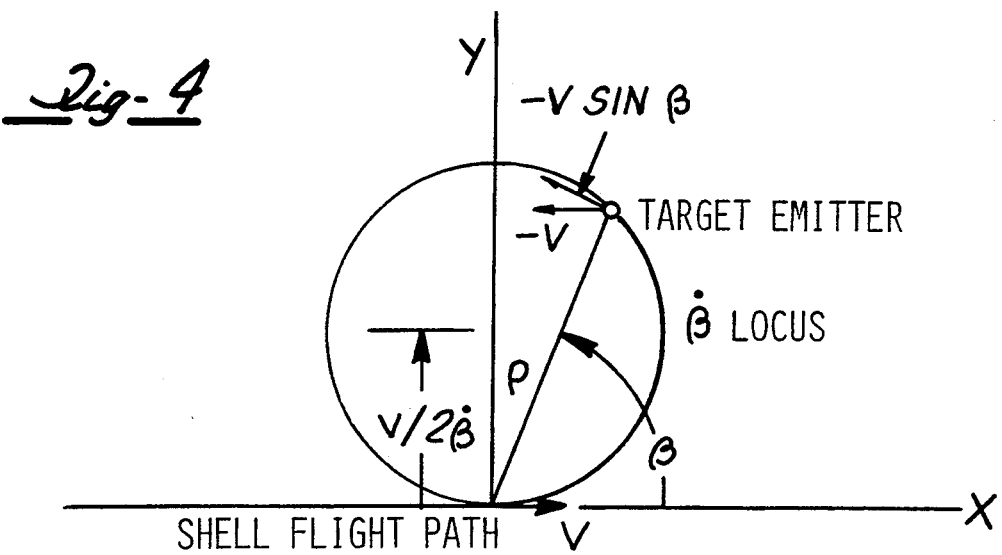
FIG. 4 is a plot illustrating the locus of points for various bearing rates.

To understand the manner in which the emitter location relative to the shell is calculated using telemetered information as well as information on the position and velocity of the shell, consider first the simplified situation illustrated in FIG. 4 in which the shell flight path and the emission target form a plane surface. Let the shell's velocity vector, v, be the x axis of a shell based coordinate system. The emitter then appears to an observer on the shell to be moving in the opposite direction at a velocity, $-v$. The bearing rate, $\dot{\beta}$, can be found by dividing the tangential component, $-v \sin \beta$, of this velocity vector by p, range from the vehicle to the target. In polar coodinates, the range is simply expressed as:

$$\rho = \frac{v \sin \beta}{\dot{\beta}}$$

This is the equation of a circle tangent to the velocity vector whose center is offset in the y direction by the circle radius, $v/2\dot{\beta}$. The bearing rate, $\dot{\beta}$, to an emitter at any point on the circle would be the same so that the circle is the locus of points for a given bearing rate. It should be noted that if the bearing, $\beta$, and the bearing rate, $\dot{\beta}$, are measured simultaneously, the emitter can be located instantaneously.

Figure 5:
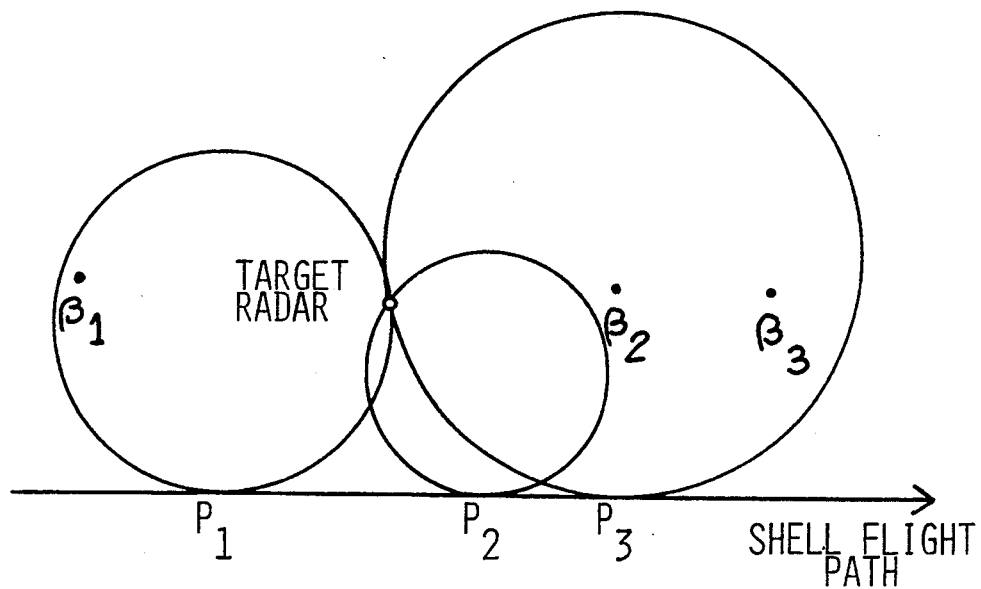
FIG. 5 is a plot illustrating the target location as determined by intersecting loci.

The bearing rate, $\dot{\beta}$, can be measured continuously or on a sampled basis as the vehicle shell proceeds along its flight path so that an emission source's position can be defined unambiguously, that is, all the loci go through the target position as illustrated in FIG. 5.

The locus of points for three dimensions for a given value of $\dot{\beta}$ measured from an instantaneous shell position is a holeless toroid, a surface of revolution obtained by rotating the $\dot{\beta}$ circle around the velocity vector. The matter is further complicated because the shell's velocity vector and therefore the toroid axis is not parallel to the ground. The constant bearing rate curves generated on the ground plane as the intersection between toroids and the ground planes can be readily computed.

The computations provide an ambiguity in apparent emission locations which occur on both sides of the shell trajectory. Telemetered signals from the infrared sensor 34 are used to resolve these ambiguities since the infrared sensor distinguishes the difference in radiation between sky and ground. An estimate of the shell roll position can be obtained from the infrared sensor information and a computation made as to when during a roll cycle an emitter signal is received.

Figure 6:
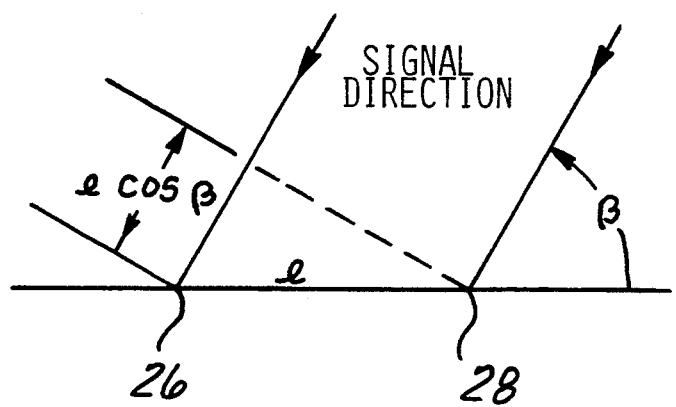
FIG. 6 is a plot illustrating the relationship between the interferometer antennae on the shell and a target.

Turning to the computation of emitter location relative to the shell from the bearing rate, consider FIG. 6 in which the two antennae, 26 and 28, spaced by a distance l are illustrated as receiving signals from a source bearing $\beta$. The range difference from the emitter source to the two antenna elements of the interferometer thus formed is $l \cos \beta$. In terms of phase difference this range of increment can be expressed as:

$$\gamma = \frac{2\pi l}{\lambda} \cos \beta \qquad \text{Equation 2}$$

where $\lambda$ is the radar wavelength. If this expression is differentiated with respect to time, the following expression is obtained:

$$\dot{\gamma} = \frac{-2\pi l}{\lambda}(\sin\beta)\dot{\beta} \qquad \text{Equation 3}$$

If this expression is solved for $\dot{\beta}$ and substituted in Equation 1, the polar expression for the $\beta$ circle or locus in a plane, Equation 1 is modified to become:

$$\rho = \frac{v\sin\beta}{\dot{\beta}} = \frac{\frac{-2\pi l}{\lambda}v\sin^2\beta}{\dot{\gamma}} \qquad \text{Equation 4}$$

The center expression is the equation for a cicle. The expression on the right is an expression for a teardrop shaped locus. For the circle, the measured or computed quantities are $\dot{\beta}$ and v, while for the teardrop locus, the measured or computed quantities are l, $\lambda$, v, and $\dot{\gamma}$. In neither case is it necessary to know or measure the angle $\beta$. The measured or computed quantities set the maximum range; either locus can be computed by assuming all values of $\beta$ from 0° to 180°.

In three dimensional space, the locus of points for $\gamma$ is a surface of revolution generated by this teardrop shaped curve. This surface of revolution is a distorted toroid and the intersection of this surface with a ground plane yields a curve which passes through the target location just as for the $\beta$ case. Thus, to locate the radar, it is necessary to know, compute or measure shell position and velocity, the radar frequency and the phase rate a minimum of two times.

The computer 18, provided with firing information from the cannon, such as elevation, muzzle velocity and the like, and meteorological information from the source 20, as well as a telemetered data, can thus readily calculate the position of an emission source relative to the cannon.

I claim:

1. A system for detecting the location of a source of radio signal emission comprising an artillery shell containing a radio receiver for receiving radio signals from said source, means for processing the received signals and for producing position signals which are a function of the position of the source relative to the position of the shell, and a radio transmitter for transmitting radio signals containing data which includes the position of the source relative to the shell; a cannon for launching the artillery shell; a ground based receiver for receiving the artillery shell's radio signals; and a computer operative to receive said data from the ground based receiver and signals relating to the cannon operation, and operative to generate signals corresponding to the location of said emission source relative to said cannon.

2. The system of claim 1 wherein the compute includes means for calculating the instantaneous position and attitude of the shell and the location of the radio signal source relative to the shell and for generating output signals related to the location of the radio signal source relative to the cannon.

3. The system of claim 2 wherein said computer includes means for generating signals used to aim the cannon at targets represented by the radio signal source.

4. The system of claim 1 wherein the artillery shell further carries explosives.

5. The system of claim 1 wherein the artillery shell carries two antennae operative to receive signals from the radio signal source.

6. The system of claim 5 including means for detecting the change in bearing rate of the artillery shell with respect to the radio signal source.

7. The system of claim 1 further including means carried by the shell for determining the rotational position of the shell relative to the horizon and means for transmitting such signal to said ground based receiver.

8. The system of claim 1 wherein said processing means includes a memory for storing information relating to the emission characteristics of a plurality of different types of radio signal sources, means for analyzing the received signals to extract a characteristic of the sources, and means for generating a signal representative of the type of source based on correlation of the stored information with the calculated information.

9. The system of claim 1 wherein said processing means includes a variable frequency controlled oscillator and means for varying the output frequency of the oscillator over a controlled range in a repetitive manner.

10. The system of claim 9 including means for mixing the signals received by the artillery shell with the oscillator signal to derive an intermediate frequency.

11. The system of claim 9 including means controlled by the signal received from the radio signal source for controlling the frequency of said oscillator.

12. The system of claim 1 including means for providing to the computer meteorological information relevant to the trajectory of the shell launched by the cannon.

13. In a system for locating sources of radio signals including a cannon and a computer operative to calculate the instantaneous position and attitude of shells launched by the cannon, a shell adapted to be launched by the cannon including sensor means for receiving the radio signals from the sources, a radio receiver connected to the sensor means, processor means for receiving the output of the radio receiver for generating signals including information relative to the location and identity of the radio signal sources, and a radio transmitter operative to receive the signals from the procesor and to modulate a transmitted carrier with said signals.

14. The shell of claim 13 wherein said sensors comprise antennae.

15. The shell of claim 13 further including explosive means contained within the shell.

16. The method of detecting sources of radio signals comprising: launching a missile in a predetermined path in the general vicinity of the sources; receiving radio signals from the sources at the missile; generating position signals within the missile which are a function of the position of the missile relative to the sources; transmitting said position signals from the missile to a ground based receiver; calculating the instantaneous position and attitude of the missile and the location of the radio signal sources relative to the missile using the position signals, and calculating the position of the radio signal sources relative to the launch point.

* * * * *